(12) United States Patent
Zhou et al.

(10) Patent No.: US 10,815,098 B2
(45) Date of Patent: Oct. 27, 2020

(54) MULTIPLE-STATE HEALTH MONITORING APPARATUS AND MONITORING METHOD FOR CRITICAL COMPONENTS IN HOISTING SYSTEM (71) Applicants: China University of Mining and Technology, Jiangsu (CN); XUZHOU COAL MINE SAFETY EQUIPMENT MANUFACTURE CO., LTD., Jiangsu (CN)

(72) Inventors: Gongbo Zhou, Jiangsu (CN); Zhencai Zhu, Jiangsu (CN); Wei Li, Jiangsu (CN); Yuxing Peng, Jiangsu (CN); Guohua Cao, Jiangsu (CN); Ping Zhou, Jiangsu (CN); Xin Shu, Jiangsu (CN); Benliang Hao, Jiangsu (CN); Chaoquan Tang, Jiangsu (CN); Lin Luo, Jiangsu (CN)

(73) Assignees: China University of Mining and Technology, Jiangsu (CN); XUZHOU COAL MINE SAFETY EQUIPMENT MANUFACTURE CO., LTD., Jiangsu (CN)

( * ) Notice: Subject to any disclaimer, the term of this patent is extended or adjusted under 35 U.S.C. 154(b) by 216 days.

(21) Appl. No.: 16/304,127

(22) PCT Filed: Dec. 27, 2017

(86) PCT No.: PCT/CN2017/118989
§ 371 (c)(1),
(2) Date: Nov. 21, 2018

(87) PCT Pub. No.: WO2019/075919
PCT Pub. Date: Apr. 25, 2019

(65) Prior Publication Data
US 2020/0131003 A1  Apr. 30, 2020

(30) Foreign Application Priority Data
Oct. 20, 2017 (CN) .......................... 2017 1 0990908

(51) Int. Cl.
*B66B 7/12* (2006.01)
*B66B 5/00* (2006.01)
(Continued)

(52) U.S. Cl.
CPC .......... *B66B 7/1238* (2013.01); *B66B 5/0031* (2013.01); *B66B 5/0037* (2013.01); *B66B 7/06* (2013.01); *G01N 21/952* (2013.01)

(58) Field of Classification Search
CPC ....... B66B 7/1238; B66B 7/06; B66B 5/0031; B66B 5/0037; G01L 5/04
(Continued)

(56) References Cited

U.S. PATENT DOCUMENTS 2,435,266 A * 2/1948 Brillhart ................... G01L 5/04
73/829
6,325,179 B1 * 12/2001 Barreiro ................ B66B 5/0037
187/393
(Continued)

FOREIGN PATENT DOCUMENTS

CN    1105755    7/1995
CN    203158963  8/2013
(Continued)

OTHER PUBLICATIONS

"International Search Report (Form PCT/ISA/210)", dated Jun. 1, 2018, pp. 1-5.

*Primary Examiner* — David S Warren
(74) *Attorney, Agent, or Firm* — JCIPRNET (57) ABSTRACT

A multiple-state health monitoring apparatus for critical components in a hoisting system includes a frame. The frame is a square structure formed by welding a plurality of
(Continued)

rectangular steels. A steel wire rope is arranged around a periphery of the square structure. A power system, a friction-and-wear apparatus, a brake-and-wear apparatus, and a tensioning apparatus are sequentially mounted from left to right on a bottom layer of the square structure. A bearing signal collection system, a tension sensor, an excitation apparatus, and a steel-wire-rope image collection system are sequentially mounted from left to right on a top layer of the square structure. The steel wire rope sequentially passes through all the apparatuses or systems and is driven by the power system to perform circling. All the apparatuses or systems are used to monitor an operation status of the steel wire rope.

10 Claims, 4 Drawing Sheets

(51) Int. Cl.
  *B66B 7/06* (2006.01)
  *G01N 21/952* (2006.01)
(58) Field of Classification Search
  USPC .......................................................... 187/391
  See application file for complete search history.

(56) References Cited

U.S. PATENT DOCUMENTS

| | | | |
|---|---|---|---|
| 7,823,705 B2* | 11/2010 | Ueda | B66B 5/0031 |
| | | | 187/393 |
| 8,807,286 B2* | 8/2014 | Puranen | B66B 7/1223 |
| | | | 187/391 |
| 9,714,155 B2* | 7/2017 | Tyni | B66B 3/00 |
| 9,771,242 B2* | 9/2017 | Kattainen | B66B 5/0037 |
| 10,399,818 B2* | 9/2019 | Kattainen | B66B 5/044 |
| 10,399,821 B2* | 9/2019 | Roberts | B66B 5/0025 |
| 2017/0010180 A1* | 1/2017 | Thomas | G01M 11/083 |
| 2017/0160331 A1* | 6/2017 | Casado Carton | H02B 13/075 |
| 2017/0247226 A1* | 8/2017 | Roberts | B66B 5/0031 |
| 2018/0282121 A1* | 10/2018 | Haapaniemi | B66B 5/0087 |
| 2019/0250202 A1* | 8/2019 | Shirakawa | H01B 13/067 |
| 2020/0131003 A1* | 4/2020 | Zhou | B66B 7/1238 |

FOREIGN PATENT DOCUMENTS

| | | |
|---|---|---|
| CN | 103383361 | 11/2013 |
| CN | 104535356 | 4/2015 |
| CN | 106395557 | 2/2017 |
| EP | 0009058 | 4/1980 |
| EP | 0390972 | 10/1990 |
| FR | 2624840 | 6/1989 |

* cited by examiner

MULTIPLE-STATE HEALTH MONITORING APPARATUS AND MONITORING METHOD FOR CRITICAL COMPONENTS IN HOISTING SYSTEM

CROSS-REFERENCE TO RELATED APPLICATION

This is a 371 application of the International PCT application serial no. PCT/CN2017/118989, filed on Dec. 27, 2017, which claims the priority benefits of China Application No. 201710990908.5 filed on Oct. 20, 2017. The entirety of each of the above-mentioned patent applications is hereby incorporated by reference herein and made a part of this specification.

BACKGROUND

Technical Field

The present invention relates to the field of mechanical health monitoring, and in particular, to a multiple-state health monitoring apparatus and monitoring method for critical components in a hoisting system.

Description of Related Art

A mine hoisting system is a large-scale complex equipment that integrates mechanical, electrical, and hydraulic components as a piece, undertakes tasks of hoisting coal and gangue, delivering materials, and lifting people and equipment, and is referred to "the throat of mine production". Once a fault occurs in a part, it adversely affects coal mine production and personal safety. A steel wire rope and a bearing are critical components of the hoisting system and play very important roles in the safe operation of the hoisting system. Therefore, it is necessary to use advanced technologies and measures to monitor and assess health conditions of critical components in the mine hoisting system in real time to prevent occurrence of faults and serious accidents.

The steel wire rope has advantages such as light weight, low flexural rigidity, and high tensile strength and is therefore widely used as a hoisting rope in mine machinery. The steel wire rope is a perishable and consumable in mine hoisting, and safety and reliability of the steel wire rope are basis to ensure stable, efficient, and safe operations of a mine hoisting system. However, in actual use, the steel wire rope is frequently replaced to prevent faults, and the scraped steel wire rope has no obvious fault features during operations. Accordingly, it is significant to monitor an operation status of the steel wire rope in real time, scientifically replace the faulty rope, extend service life of the steel wire rope, and provide early warnings of health.

A bearing is an important component of a rotating machine and is widely applied to power motors, reducers, head sheave apparatuses, main shaft apparatuses, and the like in mine hoisting system. A defect of the bearing causes abnormal vibration and noise in equipment or even causes damage to equipment. Therefore, a health condition of the bearing directly affects the safety and reliability of hoisting system. However, existing fault diagnosis technologies such as Fast Fourier Transform (FFT), wavelet transform, and empirical mode decomposition (EMD) have relatively poor fault feature modeling and representation capabilities, greatly depend on manual extract of fault features, and are relatively inadequate for mechanical fault diagnosis. Therefore, the use of advanced intelligent diagnosis technologies to monitor an operation status of the bearing in rotating machines in real time is significant for the safe operation of hoisting system.

Deep learning is a new branch of machine learning and is currently developing rapidly. Significant research achievements have been made in the fields such as image and speech processing. Deep learning has strong fault feature modeling and representation capabilities and can eliminate the dependence on technologies of processing a massive quantity of signals and diagnostic experience to complete adaptive extraction of fault features and intelligent diagnosis of health conditions. Deep learning has wide application prospects in the field of health monitoring of mechanical equipment, and the application of deep learning to the field of health monitoring of mine mechanical equipment is significant for the safe production in coal mines.

SUMMARY

The present invention provides a multiple-state health monitoring apparatus and monitoring method for critical components in a hoisting system. The health monitoring apparatus is used to simulate fault conditions of a steel wire rope and a bearing in a mine hoisting system and collect related information. A deep learning method is applied to perform intelligent fault diagnosis, so as to implement multiple-state health monitoring of the steel wire rope and the bearing in the mine hoisting system.

The technical solution used in the present invention to resolve the technical problem of the present invention is as follows.

Multiple-state health monitoring apparatus for critical components in a hoisting system includes a frame. The frame is a square structure formed by welding a plurality of rectangular steels. A steel wire rope is arranged around a periphery of the square structure. A power system, a friction-and-wear apparatus, a brake-and-wear apparatus, and a tensioning apparatus are sequentially mounted from left to right on a bottom layer of the square structure. A bearing signal collection system, a tension sensor, an excitation apparatus, and a steel-wire-rope image collection system are sequentially mounted from left to right on a top layer of the square structure. The steel wire rope sequentially passes through all the apparatuses or systems and is driven by the power system to perform circling, and all the apparatuses or systems are used to monitor an operation status of the steel wire rope.

As a further preferred option of the present invention, the power system includes a motor, a belt, a small pulley, a large pulley, and a friction guide wheel assembly. The friction guide wheel assembly includes a friction guide wheel, a cross shaft, and a bearing pedestal. The motor is mounted at an end portion of a bottom layer of the frame. The bearing pedestal and the motor are adjacently mounted on the frame. The cross shaft is fixed on the bearing pedestal. The large pulley is mounted and fixed at an end of the cross shaft. The friction guide wheel is mounted and fixed at a central position of the cross shaft. The small pulley is mounted on an output shaft of the motor, and the small pulley and the large pulley are connected through the belt. The friction-and-wear apparatus includes a hold-down cylinder, an actuating cylinder, an upper gasket, a lower gasket, and a gasket mounting plate. The actuating cylinder is horizontally mounted on the bottom layer of the frame. A rectangular steel perpendicular to the bottom layer of the frame is included in the frame. The hold-down cylinder is horizontally mounted on the rectangular steel. The upper gasket is fixedly mounted on a piston rod of the hold-down cylinder. A movable friction-and-wear slide is further mounted on the frame. The friction-and-wear slide is located below the hold-down cylinder. The gasket mounting plate is mounted on the friction-and-wear slide, and the lower gasket is mounted on the gasket mounting plate. The brake-and-wear apparatus includes a brake-and-wear cylinder, a brake-and-wear head, and a support gasket. The brake-and-wear cylinder is horizontally mounted on the rectangular steel perpendicular to the bottom layer of the frame. The brake-and-wear head is movably mounted on a piston rod of the brake-and-wear cylinder. The support gasket is horizontally fixed on the bottom layer of the frame located right below the brake-and-wear head. The tensioning apparatus includes a tension cylinder, a tension-compression sensor, a translation plate, a mounting rack, a linear guide rail, and a tension slide seat. The tension slide seat is slidably mounted on the bottom layer of the frame. The linear guide rail fixed on the bottom layer of the frame is disposed below the tension slide seat at the same time. The mounting rack is fixed on the tension slide seat. The translation plate is mounted on the mounting rack. The tension cylinder and the mounting rack are adjacently and fixedly mounted on the bottom layer of the frame. One end of the tension-compression sensor is connected to a piston rod of the tension cylinder, and the other end of the tension-compression sensor is connected to the translation plate. A guide wheel assembly is disposed on a surface of the translation plate. The steel wire rope passes through the guide wheel assembly and is tensioned or loosened under effect of the tension cylinder. The steel-wire-rope image collection system includes a camera mounting rack and a plurality of industrial CCD cameras. The camera mounting rack has a cylindrical structure. An inner hexagonal body is fixedly mounted inside the camera mounting rack. The plurality of industrial CCD cameras are uniformly distributed and mounted inside the inner hexagonal body. The steel wire rope passes through the center of the cylindrical structure. The bearing signal collection system includes a soundproof cabinet, a noise sensor, an acceleration sensor, and a head sheave. The soundproof cabinet is mounted and fixed at a top layer end of the frame. The head sheave is mounted inside the soundproof cabinet. The noise sensor is mounted inside the soundproof cabinet. The bottom of the noise sensor is fixed on the frame. The acceleration sensor is mounted on an outside bearing pedestal on which a faulty bearing can be replaced. The steel wire rope passes through the soundproof cabinet and is wound around the head sheave.

As a further preferred option of the present invention, the cross shaft is fixed on the bearing pedestal through a key and a screw. The friction guide wheel is mounted and fixed at a center of the cross shaft through a key and a screw.

As a further preferred option of the present invention, a first thermal imager configured to measure a temperature change from friction and wear between a material on a surface of the friction guide wheel and the steel wire rope when the steel wire rope is in a faulty state is mounted on a side of the friction guide wheel.

As a further preferred option of the present invention, the upper gasket is fixedly mounted on the piston rod of the hold-down cylinder through a threaded hole. The linear guide rail fixed on the frame is mounted below the friction-and-wear slide to enable the friction-and-wear slide to move on the frame.

As a further preferred option of the present invention, a second thermal imager configured to monitor a relationship between a friction-and-wear condition and a temperature change in a wearing process is further disposed at the foregoing friction-and-wear apparatus.

As a further preferred option of the present invention, the foregoing steel-wire-rope image collection system includes three industrial CCD cameras, and the three industrial CCD cameras are uniformly distributed and mounted inside the inner hexagonal body at 120 degrees therebetween by centering on a center of the inner hexagonal body.

As a further preferred option of the present invention, the steel wire rope passes through the soundproof cabinet and is wound around the head sheave. a surface of the head sheave includes a friction material. A third thermal imager is mounted in the soundproof cabinet of the bearing signal collection system.

In a method for monitoring a steel wire rope by using a multiple-state health monitoring apparatus for critical components in a hoisting system. A steel wire rope containing a corrosion fault is mounted first. The steel wire rope containing the corrosion fault sequentially passes through a large pulley, a friction-and-wear apparatus, a brake-and-wear apparatus, a tensioning apparatus, a central position of an inner hexagonal body, an excitation apparatus, a tension sensor, and a head sheave to form a complete loop. A motor is turned on for a first time to enable whole of the health monitoring apparatus to run at a slow and uniform speed and enable a corroded portion of the steel wire rope to run to a position that is not in contact with the friction-and-wear apparatus and the brake-and-wear apparatus. The motor is turned off. The friction-and-wear apparatus and the brake-and-wear apparatus are turned on. A wear fault, a dent fault, and a broken wire fault are respectively created on the steel wire rope, and the various faults are separated at an equal interval. The motor is turned on for a second time to enable whole of the monitoring apparatus to run at a slow and uniform speed again. A steel-wire-rope image collection system is turned on at this time, and three industrial CCD cameras are used to extract image data information from a plurality of angles. The steel-wire-rope image collection system transmits collected images into a host computer, the images are preprocessed and then input into a CNN that has been trained in advance, and the host computer performs parallel computation on data to implement fast recognition and classification of a fault in an image. A result is output eventually to obtain a type of the fault of the steel wire rope.

In a method for monitoring a bearing by using a multiple-state health monitoring apparatus for critical components in a hoisting system, a normal or faulty bearing is mounted first on an outside bearing pedestal of a bearing signal collection system. A healthy steel wire rope sequentially passes through a large pulley, a friction-and-wear apparatus, a brake-and-wear apparatus, a tensioning apparatus, a central position of an inner hexagonal body, an excitation apparatus, a tension sensor, and a head sheave to form a complete loop, and a tensioning force of a tension cylinder is adjusted simultaneously. A motor is turned on to enable whole of the health monitoring apparatus to run at a uniform speed, and a third thermal imager and an acceleration sensor work together to extract noise and temperature data information. The collected noise and temperature data information is transmitted into a host computer, noise signals are preprocessed and then input into a RNN that has been trained in advance, and the host computer performs parallel computation on data to implement fast recognition and classification of a fault feature in a noise signal of the bearing. A result is output eventually to obtain a type of the fault of the bearing.

By using the foregoing technical solutions, compared with the prior art, the present invention has following beneficial effects.

The multiple-state health monitoring apparatus for critical components in a hoisting system of the present invention has a simple structure, is convenient to operate, and can simulate fault conditions of the steel wire rope and the bearing in the hoisting system and collect related information without on-site data collection.

A deep learning method is used in the present invention, so that the dependence on technologies of processing a massive quantity of signals and diagnostic experience to complete adaptive extraction of fault features and intelligent diagnosis of health conditions can be eliminated, and relatively high diagnostic precision is achieved.

In the present invention, a CNN (Convolutional Neural Network) is used to process steel-wire-rope image data. An RNN (Recurrent Neural Network) is used to process noise data of a bearing. A DBN (Deep Belief Network) is used to process abnormal vibration data of the bearing. The research method covers several classic deep learning algorithms. The methods and conclusions may further be applied to health monitoring and fault diagnosis of other mine mechanical equipment.

BRIEF DESCRIPTION OF THE DRAWINGS

The present invention is further described below with reference to the accompanying drawings and embodiments.

DESCRIPTION OF THE EMBODIMENTS

The present invention is now further described in detail with reference to the accompanying drawings. These accompanying drawings are all simplified schematic views and merely schematically describe the basic structure of the present invention. Therefore, the accompanying drawings only show the composition related to the present invention.

As shown in FIG. 1 to FIG. 7, the present invention includes following technical features: a power system 1, a motor 1-1, a belt 1-2, a small pulley 1-3, a large pulley 1-4, a friction guide wheel 1-5, a cross shaft 1-6, a bearing pedestal 1-7, a friction-and-wear apparatus 2, a hold-down cylinder 2-1, an actuating cylinder 2-2, an upper gasket 2-3, a lower gasket 2-4, a gasket mounting plate 2-5, a brake-and-wear apparatus 3, a brake-and-wear cylinder 3-1, a brake-and-wear head 3-2, a support gasket 3-3, a tensioning apparatus 4, a tension cylinder 4-1, a tension-compression sensor 4-2, a translation plate 4-3, a mounting rack 4-4, a linear guide rail 4-5, a slide 4-6, a steel-wire-rope image collection system 5, a camera mounting rack 5-1, an industrial CCD camera 5-2, an excitation apparatus 6, a bearing signal collection system 7, a soundproof cabinet 7-1, a noise sensor 7-2, an acceleration sensor 7-3, a head sheave 7-4, a tension sensor 8, a steel wire rope 9, a frame 10, a first thermal imager 11-1, a second thermal imager 11-2, and a third thermal imager 11-3.

Multiple-state health monitoring apparatus for critical components in a hoisting system of the present invention includes a frame. The frame is a square structure formed by welding a plurality of rectangular steels. A steel wire rope is arranged around a periphery of the square structure. A power system, a friction-and-wear apparatus, a brake-and-wear apparatus, and a tensioning apparatus are sequentially mounted from left to right on a bottom layer of the square structure. A bearing signal collection system, a tension sensor, an excitation apparatus, and a steel-wire-rope image collection system are sequentially mounted from left to right on a top layer of the square structure. The steel wire rope sequentially passes through all the foregoing apparatuses or systems and is driven by the power system to perform circling. All the foregoing apparatuses or systems are used to monitor an operation status of the steel wire rope.

Figure 1:
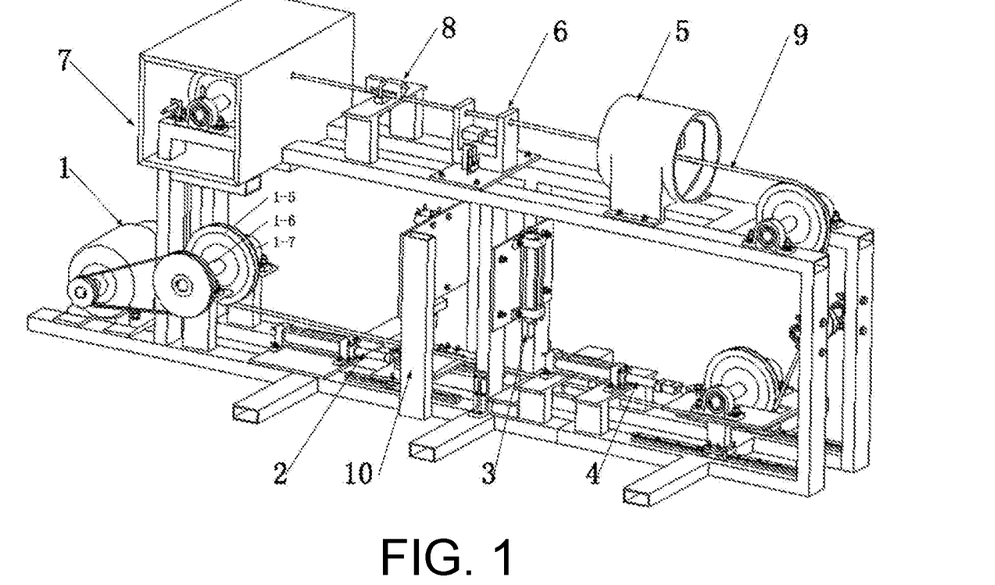
FIG. 1 is a schematic view of an overall structure according to the present invention.
Figure 2:
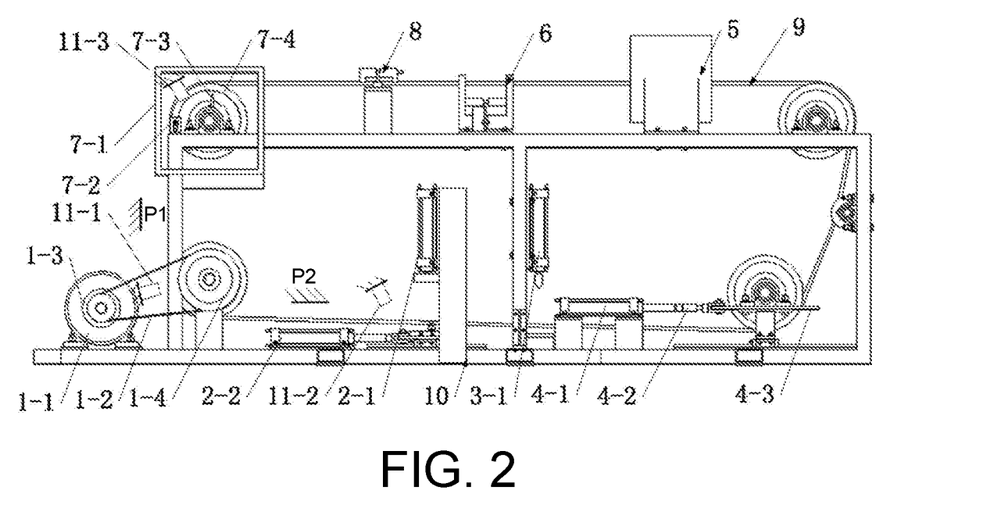
FIG. 2 is a front view of an overall structure according to the present invention.

As shown in FIG. 1 and FIG. 2, as a further preferred option of the present invention, the power system includes a motor, a belt, a small pulley, a large pulley, and a friction guide wheel assembly. The foregoing friction guide wheel assembly includes a friction guide wheel, a cross shaft, and a bearing pedestal. The motor is mounted at an end portion of a bottom layer of the frame. The bearing pedestal and the motor are adjacently mounted on the frame. The cross shaft is fixed on the bearing pedestal. The large pulley is mounted and fixed at an end of the cross shaft. The friction guide wheel is mounted and fixed at a central position of the cross shaft. The small pulley is mounted on an output shaft of the motor. The small pulley and the large pulley are connected through the belt. In this way, power of the motor is transferred to the friction guide wheel assembly. It should be noted that all other guide components in the power system have composition and mounting manners that are consistent with those of the friction guide wheel assembly.

Figure 3:
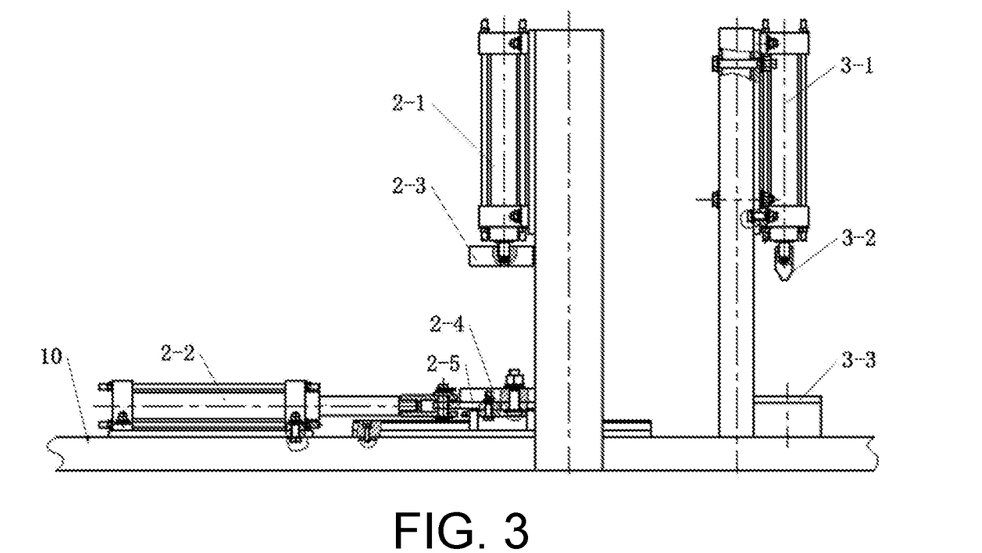
FIG. 3 is a schematic structural view of a friction-and-wear apparatus and a brake-and-wear apparatus according to the present invention.

As shown in FIG. 1, FIG. 2, and FIG. 3, the friction-and-wear apparatus includes a hold-down cylinder, an actuating cylinder, an upper gasket, a lower gasket, and a gasket mounting plate. The actuating cylinder is horizontally mounted on the bottom layer of the frame. A rectangular steel perpendicular to the bottom layer of the frame is included inside the frame. The hold-down cylinder is horizontally mounted on the rectangular steel. The upper gasket is fixedly mounted on a piston rod of the hold-down cylinder. A movable friction-and-wear slide is further mounted on the frame. The friction-and-wear slide is located below the hold-down cylinder. The gasket mounting plate is mounted on the friction-and-wear slide. The gasket mounting plate may move transversely along with the friction-and-wear slide. The lower gasket is mounted on the gasket mounting plate.

The friction-and-wear apparatus simulates friction-and-wear conditions between the steel wire rope and the gaskets under a particular hold-down force: During simulation of high-speed wear, the actuating cylinder does not operate and remains in an original position, the power system drives the steel wire rope to run at a high speed, and the hold-down cylinder is loaded and unloaded according to a program to wear down a same segment of the steel wire rope. During simulation of micromotion wear, the power system does not operate, the hold-down cylinder stays in a loaded state, and the actuating cylinder reciprocates to wear down a same segment of the steel wire rope. In a wearing process, a second thermal imager is used at the same time to measure the temperature to obtain a relationship between a friction-and-wear condition and a temperature change.

As shown in FIG. 1, FIG. 2, and FIG. 3, the brake-and-wear apparatus includes a brake-and-wear cylinder, a brake-and-wear head, and a support gasket. The brake-and-wear cylinder is horizontally mounted on the rectangular steel perpendicular to the bottom layer of the frame. The brake-and-wear head is movably mounted on a piston rod of the brake-and-wear cylinder. The angle of the brake-and-wear head is adjustable, and the model of the brake-and-wear head may be changed. The support gasket is horizontally fixed on the bottom layer of the frame located right below the brake-and-wear head to provide support when the brake-and-wear head punches the steel wire rope.

The brake-and-wear apparatus is configured to simulate an actual fault condition such as a dent or a broken wire on a surface of the steel wire rope. Dents having different angles and different depths are created under different impact forces or pressure, and a manual method is combined to create broken wires having different numbers and positions, so that a steel-wire-rope image collection system collects image information and an excitation apparatus detects a valid metal sectional area.

Figure 4:
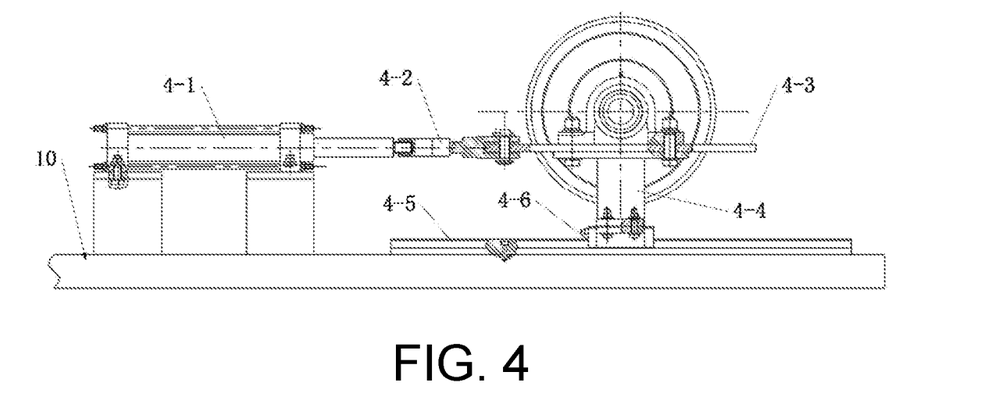
FIG. 4 is a schematic structural view of a tensioning apparatus according to the present invention.

As shown in FIG. 1, FIG. 2, and FIG. 4, the tensioning apparatus includes a tension cylinder, a tension-compression sensor, a translation plate, a mounting rack, a linear guide rail, and a tension slide seat. The tension slide seat is slidably mounted on the bottom layer of the frame. The linear guide rail fixed on the bottom layer of the frame is disposed below the tension slide seat at the same time. The mounting rack is fixed on the tension slide seat, and the translation plate is mounted on the mounting rack. The foregoing tension cylinder and mounting rack are adjacently and fixedly mounted on the bottom layer of the frame. One end of the tension-compression sensor is connected to a piston rod of the tension cylinder, and the other end of the tension-compression sensor is connected to the translation plate. A guide wheel assembly is disposed on a surface of the translation plate. The steel wire rope passes through the guide wheel assembly and is tensioned or loosened under the effect of the tension cylinder. The tension-compression sensor may be used to measure a tensioning force.

Figure 5:
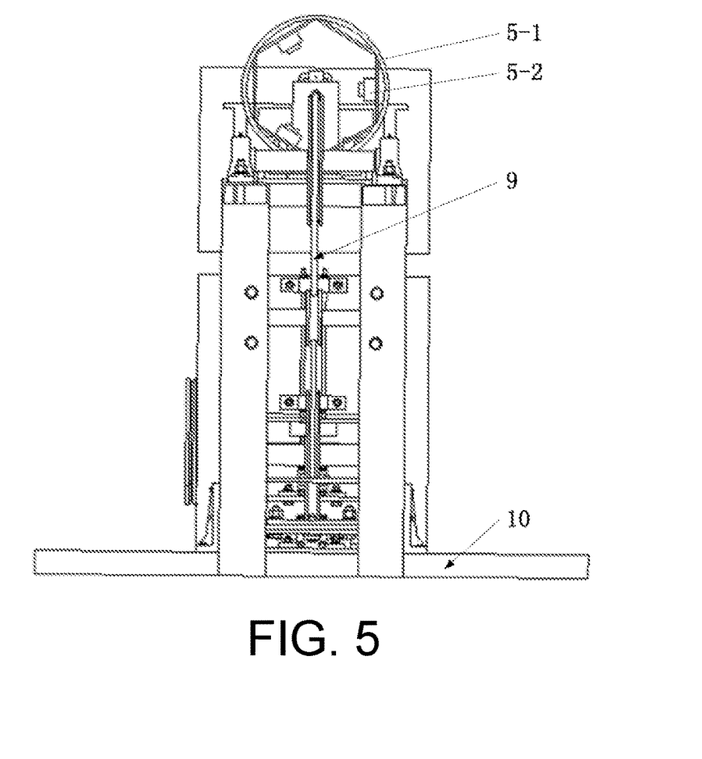
FIG. 5 is a right view of an overall structure according to the present invention.

As shown in FIG. 1, FIG. 2, and FIG. 5, the steel-wire-rope image collection system includes a camera mounting rack and a plurality of industrial CCD cameras. The camera mounting rack has a cylindrical structure. An inner hexagonal body is fixedly mounted inside the camera mounting rack. The plurality of industrial CCD cameras are uniformly distributed and mounted inside the inner hexagonal body. The foregoing steel wire rope passes through a center of the cylindrical structure for photographing of image information of the surface of the steel wire rope in all directions to make preparations for image processing and further fault diagnosis and recognition.

As shown in FIG. 1 and FIG. 2, the excitation apparatus is mounted on the frame through a base and may excite the steel wire rope to detect a valid metal sectional area of the steel wire rope and may further obtain the remaining strength (a maximum fracture force) of the steel wire rope.

As shown in FIG. 1 and FIG. 2, the bearing signal collection system includes a soundproof cabinet, a noise sensor, an acceleration sensor, and a head sheave. The soundproof cabinet is mounted and fixed at a top layer end of the frame. The head sheave is mounted inside the soundproof cabinet. The noise sensor is mounted inside the soundproof cabinet. A bottom portion of the noise sensor is fixed on the frame. The acceleration sensor is mounted on an outside bearing pedestal on which a faulty bearing is replaceable. The steel wire rope passes through the soundproof cabinet and is wound around the head sheave. During the collection of noise and vibration signals of the bearing in the bearing signal collection system, the changes of noise and vibration signals of a normal bearing and a faulty bearing in a rotating and operating state are simulated. Meanwhile, a third thermal imager is mounted in the soundproof cabinet of the bearing signal collection system and is configured to measure a temperature change caused by wear when the bearing is in a faulty state.

As shown in FIG. 1 and FIG. 2, the tension sensor is mounted on the frame. When one tension sensor is added at a position I shown in FIG. 2, the magnitude of tension on the head sheave in the bearing signal collection system may be measured. When one tension sensor is respectively added at the position I and a position II shown in FIG. 2, the magnitude of tension on the friction guide wheel may be measured.

As a further preferred option of the present invention, the cross shaft is fixed on the bearing pedestal through a key and a screw, and the friction guide wheel is mounted and fixed at a center of the cross shaft through a key and a screw.

As a further preferred option of the present invention, a first thermal imager is mounted on a side of the friction guide wheel, and is configured to measure a temperature change from friction and wear between a material on a surface of the friction guide wheel and the steel wire rope when the steel wire rope is in a faulty state.

As a further preferred option of the present invention, the upper gasket is fixedly mounted on the piston rod of the hold-down cylinder through a threaded hole. The linear guide rail fixed on the frame is mounted below the friction-and-wear slide to enable the friction-and-wear slide to move on the frame.

As a further preferred option of the present invention, a second thermal imager is further disposed at the foregoing friction-and-wear apparatus, and is configured to monitor a relationship between a friction-and-wear condition and a temperature change in a wearing process.

As a further preferred option of the present invention, the foregoing steel-wire-rope image collection system includes three industrial CCD cameras, and the three industrial CCD cameras are uniformly distributed and mounted inside the inner hexagonal body at 120 degrees therebetween with the hexagonal center as the center of a circle.

As a further preferred option of the present invention, the steel wire rope passes through the soundproof cabinet and is wound around the head sheave. The foregoing head sheave includes a friction material on the surface thereof. A third thermal imager is mounted in the soundproof cabinet of the bearing signal collection system.

Figure 6:
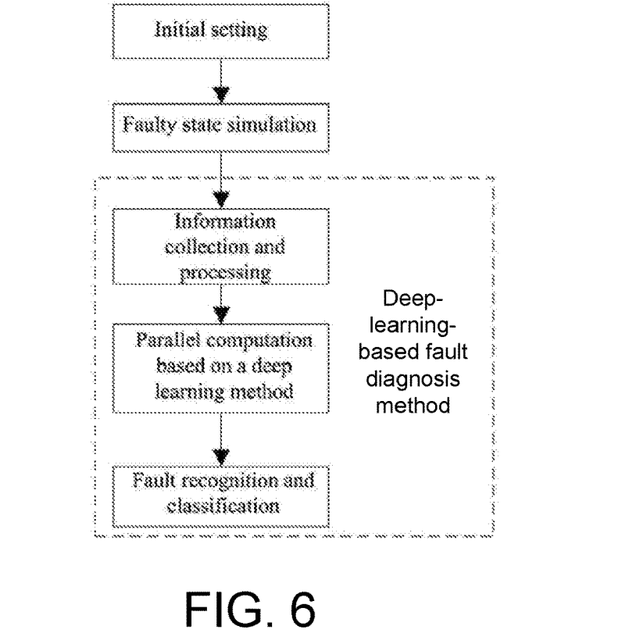
FIG. 6 is a flowchart of a health monitoring method according to the present invention.

As shown in FIG. 6, the foregoing health monitoring apparatus may perform multiple-state health monitoring on critical components in the system, for example, initial setting, faulty state simulation, fault information collection and processing, parallel computation based on a deep learning method, and fault recognition and classification. Specific implementation manners are as follows.

Embodiment 1: In a method for monitoring a steel wire rope by using a multiple-state health monitoring apparatus for critical components in a hoisting system, a steel wire rope containing a corrosion fault is mounted first. The steel wire rope containing the corrosion fault sequentially passes through a large pulley, a friction-and-wear apparatus, a brake-and-wear apparatus, a tensioning apparatus, a central position of an inner hexagonal body, an excitation apparatus, a tension sensor, and the head sheave to form a complete loop. A motor is turned on for a first time to enable whole of the health monitoring apparatus to run at a slow and uniform speed and enable a corroded portion of the steel wire rope to run to a specified position, that is, any position away from the friction-and-wear apparatus and the brake-and-wear apparatus. The motor is turned off. Pressures of the hold-down cylinder and the actuating cylinder are adjusted. A movement range of the piston of the actuating cylinder is set. The friction-and-wear apparatus is turned on. The upper gasket holds down the steel wire rope under the force applied by the hold-down cylinder. The actuating cylinder reciprocates for a particular time to generate a particular wear fault on the surface of the steel wire rope. The friction-and-wear apparatus is turned off and reset. The motor is turned on to enable any segment of the healthy steel wire rope to run to the brake-and-wear apparatus. The motor is turned off. The pressure of a brake-and-wear cylinder is adjusted. A mounting angle of a punch head is set. The brake-and-wear apparatus is turned on and punches the steel wire rope to create dent faults having different angles and depths. The brake-and-wear apparatus is turned off and reset. The motor is turned on to enable the segment of the healthy steel wire rope to run to the brake-and-wear apparatus. The motor is turned off. The punch is replaced with a new type of punch head (this type of punch head has a head portion sharper than that of the punch head which is used for creating a dent). The angle of the punch head is set to be perpendicular to an axial line of the steel wire rope. The pressure of the brake-and-wear cylinder is adjusted. The brake-and-wear apparatus is turned on. A manual manner is combined to create broken wire faults having different numbers and positions. When the steel wire rope at the same time has the corrosion fault, the wear fault, the dent fault, and the broken wire fault, the motor is turned on for a second time to enable whole of the monitoring apparatus to run at a slow and uniform speed again. In this case, the steel-wire-rope image collection system is turned on. Three industrial CCD cameras are used to extract image data information from a plurality of angles. The steel-wire-rope image collection system transmits collected images into a host computer. The images are preprocessed and then input into a CNN (Convolution Neural Network) that has been trained in advance. The host computer performs parallel computation on data to implement fast recognition and classification of a fault in an image. A result is output eventually to obtain a type of the fault of the steel wire rope.

Embodiment 2: In a method for monitoring a bearing by using a multiple-state health monitoring apparatus for critical components in a hoisting system, a normal or faulty bearing is mounted first on an outside bearing pedestal of a bearing signal collection system (a plurality of faulty bearings may be chosen to simulate different faults, including an inner ring fault, a rolling element fault, a cage fault, and an outer ring fault). A healthy steel wire rope sequentially passes through a large pulley, a friction-and-wear apparatus, a brake-and-wear apparatus, a tensioning apparatus, a central position of an inner hexagonal body, an excitation apparatus, a tension sensor, and a head sheave to form a complete loop, and a tensioning force of a tension cylinder is adjusted at the same time (a plurality of tensioning forces may be chosen to simulate the tension of the steel wire rope under different loads). A motor is turned on to enable whole of the health monitoring apparatus to run at a uniform speed (a plurality of speeds may be chosen to simulate different operation speeds). A third thermal imager and an acceleration sensor work together to extract noise and temperature data information. The collected noise and temperature data information is transmitted into a host computer. Noise signals are preprocessed and then input into an RNN (Recurrent Neural Network) that has been trained in advance. The host computer performs parallel computation on data to implement fast recognition and classification of a fault feature in a noise signal of the bearing. A result is output eventually to obtain a type of the fault in the bearing.

Embodiment 3: In a method for monitoring a bearing by using a multiple-state health monitoring apparatus for critical components in a hoisting system, a normal or faulty bearing is mounted first on an outside bearing pedestal of a bearing signal collection system (a plurality of faulty bearings may be chosen to simulate different faults, including an inner ring fault, a rolling element fault, a cage fault, and an outer ring fault). A healthy steel wire rope sequentially passes through a large pulley, a friction-and-wear apparatus, a brake-and-wear apparatus, a tensioning apparatus, a central position of an inner hexagonal body, an excitation apparatus, a tension sensor, and a head sheave to form a complete loop. A tensioning force of a tension cylinder is adjusted at the same time (a plurality of tensioning forces may be chosen to simulate the tension of the steel wire rope under different loads). A motor is turned on to enable the whole of the health monitoring apparatus to run at a uniform speed (a plurality of speeds may be chosen to simulate different operation speeds). A third thermal imager and an acceleration sensor work together to extract vibration signals and temperature data information of the bearing pedestal. The collected vibration signals of the bearing pedestal are transmitted into a host computer. The vibration signals are preprocessed and then input into a DBN (Deep Belief Network) model that has been trained in advance. The host computer performs parallel computation on data to implement fast recognition and classification of a fault feature in a vibration signal. A result is output eventually to obtain a type of the fault in the bearing.

Figure 7:
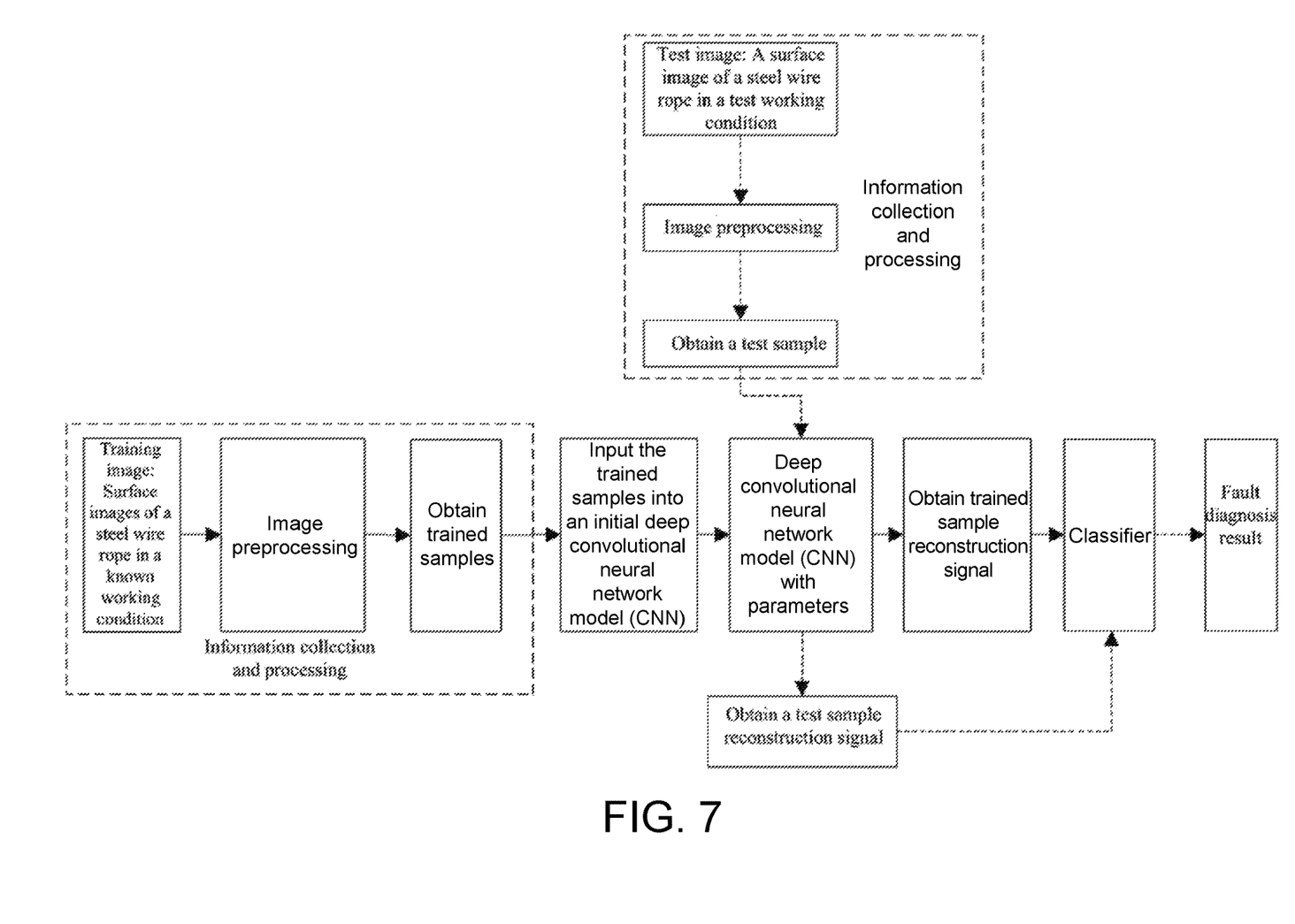
FIG. 7 is a flowchart of a fault diagnosis method based on deep learning according to the present invention.

As shown in FIG. 7, for example, the host computer uses a deep-learning-based fault diagnosis method to perform fault diagnosis in surface images of the steel wire rope. First, deep learning of fault information in surface images of the steel wire rope in known working conditions is performed to obtain training sample reconstruction signals. Then, deep learning of fault information in surface images of the steel wire rope in a test working condition is performed to obtain a test sample reconstruction signal. Finally, a classifier (for example, a support vector machine, a shallow neural network, and so on) is used to match the test sample reconstruction signal against the training sample reconstruction signals and perform fault recognition and classification according to similarity of the reconstruction signal to obtain a fault diagnosis result. GPU-accelerated parallel computation is used in deep learning to improve the computational efficiency.

Further, as shown in FIG. 6 and FIG. 7, in a multiple-state health monitoring method for critical components in a hoisting system, a CNN (Convolutional Neural Network) is used to complete determination of the type of a fault on the surface of the steel wire rope. A dynamic safety coefficient of the steel wire rope may be calculated by combining remaining strength at the fault measured by an excitation apparatus and real-time tension (a tension sensor difference value between two sides of the fault) at the fault measured by a tension sensor. A minimum full-rope safety coefficient is used as a safety evaluation standard for the steel wire rope and is compared with a regulated safety coefficient, so as to evaluate the safety of the steel wire rope. When the minimum full-rope safety coefficient is not less than the regulated safety coefficient, the steel wire rope is in a healthy condition.

The dynamic safety coefficient:

$$k_{ai} = \frac{F_{Ri}}{F_i}$$

In the formula, $F_{Ri}$ is the remaining strength at an $i^{th}$ steel wire rope fault. For the foregoing remaining strength, an excitation apparatus is used to excite the steel wire rope to detect a valid metal sectional area of the steel wire rope to further obtain the maximum fracture force of the steel wire rope. This fracture force is the remaining strength. $F_i$ is the measured tension at an $i^{th}$ steel wire rope fault, and the minimum full-rope safety coefficient is used as the safety evaluation standard for the steel wire rope:

$$k_{amin} = \frac{\min\{F_{Ri}\}}{\max\{F_i\}} \geq [k_a]$$

In the formula, min $\{F_{Ri}\}$ is the minimum full-steel-wire-rope remaining strength, max $\{F_i\}$ is maximum measured full-rope tension, $[k_a]$ is a safety coefficient specified in the procedure, and the value of $[k_a]$ is a ratio of a sum of the designed fracture force to a maximum static load. According to this formula, minimum remaining strength and maximum measured tension at the position i are obtained. If a ratio of the minimum remaining strength to the maximum measured tension is greater than or equal to the safety coefficient regulated in the procedure, it indicates that the steel wire rope is healthy.

As shown in FIG. 6 and FIG. 7, in a multiple-state health monitoring method for critical components in a hoisting system, RNN and DBN are used respectively to complete the determination of the type of a fault in a bearing. A diagnosis process and diagnostic results are compared and analyzed to provide reference for a health monitoring method for a rotating machine in the hoisting system and selection of the deep neural network models during actual engineering.

As shown in FIG. 1 to FIG. 7, the multiple-state health monitoring apparatus and method for critical components in a hoisting system may further be used to research relationships between following parameters: relationships between fault condition and fault severity of the steel wire rope, and parameters such as friction temperature, tension, remaining strength, and head sheave contact stress; relationships between fault condition and fault severity of the bearing, and parameters such as wear temperature, noise, longitudinal load, and rotational speed, and the like. The relationships between the foregoing parameters has a particular guidance effect for assessment of health statuses of the steel wire rope and the bearing, and the fault severity may be determined based on that the type of the fault is clarified.

A person skilled in the art may understand that unless otherwise defined, all terms (including technical terms and scientific terms) used herein have meanings same as those generally understood by a person of ordinary skill in the art of the present application. It should be further understood that terms such as those defined in general dictionaries should be understood to have meanings same as those in the context of the prior art, and unless similarly defined herein, ideal or formal meanings are not used.

The "and/or" in the present application means that cases of "separately exists" and "both exist" are both included.

The "connection" in the present application may be direct connection between parts or may be indirect connection between parts.

In light of the teachings of the foregoing ideal embodiments according to the present invention, by using the content described above, a related worker may totally make various variations and modifications without departing from the scope of the technical concept of the present invention. The technical scope of the present invention is not limited to the content in the specification, and the technical scope of the present invention shall be determined according to the scope of the claims.

What is claimed is:

1. A multiple-state health monitoring apparatus for critical components in a hoisting system, the multiple-state health monitoring apparatus comprising a frame, wherein the frame is a square structure, a steel wire rope is arranged around a periphery of the square structure, a power system, a friction-and-wear apparatus, a brake-and-wear apparatus, and a tensioning apparatus are sequentially mounted from left to right on a bottom layer of the square structure, a bearing signal collection system, a tension sensor, an excitation apparatus, and a steel-wire-rope image collection system are sequentially mounted from left to right on a top layer of the square structure, the steel wire rope sequentially passes through the power system, the friction-and-wear apparatus, the brake-and-wear apparatus, and the tensioning apparatus, wherein the steel wire rope is driven by the power system to perform circling, and the power system, the friction-and-wear apparatus, the brake-and-wear apparatus, and the tensioning apparatus are used to monitor an operation status of the steel wire rope.

2. The multiple-state health monitoring apparatus for critical components in a hoisting system according to claim 1, wherein the power system comprises a motor, a belt, a small pulley, a large pulley, and a friction guide wheel assembly, the friction guide wheel assembly comprises a friction guide wheel, a cross shaft, and a bearing pedestal, wherein, the motor is mounted at an end portion of a bottom layer of the frame, the bearing pedestal and the motor are adjacently mounted on the frame, the cross shaft is fixed on the bearing pedestal, the large pulley is mounted and fixed at an end of the cross shaft, the friction guide wheel is mounted and fixed at a central position of the cross shaft, the small pulley is mounted on an output shaft of the motor, and the small pulley and the large pulley are connected through the belt;

the friction-and-wear apparatus comprises a hold-down cylinder, an actuating cylinder, an upper gasket, a lower gasket, and a gasket mounting plate, the actuating cylinder is horizontally mounted on the bottom layer of the frame, a rectangular steel perpendicular to the bottom layer of the frame is comprised inside the frame, the hold-down cylinder is horizontally mounted on the rectangular steel, wherein the upper gasket is fixedly mounted on a piston rod of the hold-down cylinder, a movable friction-and-wear slide is further mounted on the frame, the friction-and-wear slide is located below the hold-down cylinder, the gasket mounting plate is mounted on the friction-and-wear slide, and the lower gasket is mounted on the gasket mounting plate;

the brake-and-wear apparatus comprises a brake-and-wear cylinder, a brake-and-wear head, and a support gasket, the brake-and-wear cylinder is horizontally mounted on the rectangular steel perpendicular to the bottom layer of the frame, the brake-and-wear head is movably mounted on a piston rod of the brake-and-wear cylinder, and the support gasket is horizontally fixed on the bottom layer of the frame located right below the brake-and-wear head;

the tensioning apparatus comprises a tension cylinder, a tension-compression sensor, a translation plate, a mounting rack, a linear guide rail, and a tension slide seat, the tension slide seat is slidably mounted on the bottom layer of the frame, the linear guide rail fixed on the bottom layer of the frame is disposed below the tension slide seat, the mounting rack is fixed on the tension slide seat, the translation plate is mounted on the mounting rack, the tension cylinder and the mounting rack are adjacently and fixedly mounted on the bottom layer of the frame, one end of the tension-compression sensor is connected to a piston rod of the tension cylinder, the other end of the tension-compression sensor is connected to the translation plate, a guide wheel assembly is disposed on a surface of the translation plate, and the steel wire rope passes through the guide wheel assembly and is tensioned or loosened under effect of the tension cylinder;

the steel-wire-rope image collection system comprises a camera mounting rack and a plurality of industrial CCD cameras, the camera mounting rack has a cylindrical structure, an inner hexagonal body is fixedly mounted inside the camera mounting rack, the plurality of industrial CCD cameras are uniformly distributed and mounted inside the inner hexagonal body, and the steel wire rope passes through a center of the cylindrical structure; and the bearing signal collection system comprises a soundproof cabinet, a noise sensor, an acceleration sensor, and a head sheave, the soundproof cabinet is mounted and fixed at a top layer end of the frame, the head sheave is mounted inside the soundproof cabinet, the noise sensor is mounted inside the soundproof cabinet, a bottom portion of the noise sensor is fixed on the frame, the acceleration sensor is mounted on an outside bearing pedestal on which a faulty bearing is capable of being replaced, and the steel wire rope passes through the soundproof cabinet and is wound around the head sheave.

3. The multiple-state health monitoring apparatus for critical components in a hoisting system according to claim 2, wherein the cross shaft is fixed on the bearing pedestal through a key and a screw, and the friction guide wheel is mounted and fixed at a center of the cross shaft through a key and a screw.

4. The multiple-state health monitoring apparatus for critical components in a hoisting system according to claim 2, wherein a first thermal imager is mounted on a side of the friction guide wheel, and is configured to measure a temperature change from friction and wear between a material on a surface of the friction guide wheel and the steel wire rope when the steel wire rope is in a faulty state.

5. The multiple-state health monitoring apparatus for critical components in a hoisting system according to claim 2 wherein the upper gasket is fixedly mounted on the piston rod of the hold-down cylinder through a threaded hole, and the linear guide rail fixed on the frame is mounted below the friction-and-wear slide to enable the friction-and-wear slide to move on the frame.

6. The multiple-state health monitoring apparatus for critical components in a hoisting system according to claim 4 wherein a second thermal imager is further disposed at the friction-and-wear apparatus, and is configured to monitor a relationship between a friction-and-wear condition and a temperature change in a wear process.

7. The multiple-state health monitoring apparatus for critical components in a hoisting system according to claim 2 wherein the steel-wire-rope image collection system comprises three industrial CCD cameras, and the three industrial CCD cameras are uniformly distributed and mounted inside the inner hexagonal body at 120 degrees therebetween by centering on a center of the inner hexagonal body.

8. The multiple-state health monitoring apparatus for critical components in a hoisting system according to claim 2, wherein the steel wire rope passes through the soundproof cabinet and is wound around the head sheave, a surface of the head sheave comprises a friction material, and a third thermal imager is mounted in the soundproof cabinet of the bearing signal collection system.

9. A method for monitoring a steel wire rope by using a multiple-state health monitoring apparatus for critical components in a hoisting system, the method comprising:

first mounting a steel wire rope containing a corrosion fault;

passing the steel wire rope containing the corrosion fault sequentially through a large pulley, a friction-and-wear apparatus, a brake-and-wear apparatus, a tensioning apparatus, a central position of an inner hexagonal body, an excitation apparatus, a tension sensor, and a head sheave to form a complete loop;

turning on a motor for a first time to enable the health monitoring apparatus to run at a uniform speed and enable a corroded portion of the steel wire rope to run to a position that is not in contact with the friction-and-wear apparatus and the brake-and-wear apparatus;

turning off the motor, turning on the friction-and-wear apparatus and the brake-and-wear apparatus, and creating a wear fault, a dent fault, and a broken wire fault respectively on the steel wire rope, wherein the wear fault, the dent fault, and the broken wire fault are separated at an equal interval;

turning on the motor for a second time to enable the monitoring apparatus to further run at a slow and uniform speed, and turning on a steel-wire-rope image collection system at this time, and using three industrial CCD cameras to extract image data information from a plurality of angles;

the steel-wire-rope image collection system transmits collected images into a host computer, the images are preprocessed and then input into a CNN (Convolutional Neural Network) that has been trained in advance, and the host computer performs parallel computation on data to implement fast recognition and classification of a fault in an image; and a result is output eventually to obtain a type of the fault of the steel wire rope.

10. A method for monitoring a bearing by using a multiple-state health monitoring apparatus for critical components in a hoisting system, the method comprising:

first mounting a normal or faulty bearing on an outside bearing pedestal of a bearing signal collection system;

passing a healthy steel wire rope sequentially through a large pulley, a friction-and-wear apparatus, a brakeand-wear apparatus, a tensioning apparatus, a central position of an inner hexagonal body, an excitation apparatus, a tension sensor, and a head sheave to form a complete loop, and adjusting a tensioning force of a tension cylinder simultaneously;

turning on a motor to enable the health monitoring apparatus to run at a uniform speed, and using a thermal imager and an acceleration sensor together to extract noise and temperature data information;

transmitting the collected noise and temperature data information into a host computer, preprocessing noise signals and then inputting into a RNN (Recurrent Neural Network) that has been trained in advance, wherein the host computer performs parallel computation on data to implement fast recognition and classification of a fault feature in a noise signal of the bearing; and a result is output eventually to obtain a type of the fault of the bearing.

* * * * *